US012236956B2

(12) United States Patent
Joller et al.

(10) Patent No.: US 12,236,956 B2
(45) Date of Patent: Feb. 25, 2025

(54) AUDIO CONTENT PROCESSING SYSTEMS AND METHODS

(71) Applicant: A9.com, Inc, Palo Alto, CA (US)

(72) Inventors: Mari Joller, New York City, NY (US); Ottokar Tilk, Tallinn (EE); Aleksandr Tkatšenko, Tallinn (EE); Johnathan Joseph Groat, Taylor, MI (US); Mark Fišel, Tartu (EE); Kaur Karus, Tartu (EE)

(73) Assignee: A9.com, Inc., Palo Alto, CA (US)

( * ) Notice: Subject to any disclaimer, the term of this patent is extended or adjusted under 35 U.S.C. 154(b) by 147 days.

(21) Appl. No.: 17/524,679

(22) Filed: Nov. 11, 2021

(65) Prior Publication Data

US 2022/0139398 A1 May 5, 2022

Related U.S. Application Data

(63) Continuation of application No. 16/584,893, filed on Sep. 26, 2019, now Pat. No. 11,183,195.
(Continued)

(51) Int. Cl.
*G10L 15/26* (2006.01)
*G06F 16/635* (2019.01)
(Continued)

(52) U.S. Cl.
CPC ............ *G10L 17/00* (2013.01); *G06F 16/635* (2019.01); *G10L 25/63* (2013.01); *G10L 25/81* (2013.01); *G10L 25/90* (2013.01)

(58) Field of Classification Search
CPC ................................. G10L 15/22; G10L 15/26
See application file for complete search history.

(56) References Cited

U.S. PATENT DOCUMENTS 8,600,745 B2  12/2013  Hirschberg et al.
8,612,211 B1  12/2013  Shires et al.
(Continued)

OTHER PUBLICATIONS

Maskey, Sameer, and Julia Hirschberg. "Comparing lexical, acoustic/prosodic, structural and discourse features for speech summarization." Ninth European conference on speech communication and technology. 2005. (Year: 2005).*
(Continued)

*Primary Examiner* — Jialong He
(74) *Attorney, Agent, or Firm* — Eversheds Sutherland (US) LLP

(57) ABSTRACT

This disclosure relates to systems and methods for processing content and, particularly, but not exclusively, systems and methods for processing audio content. Systems and methods are described that provide techniques for processing, analyzing, and/or structuring of longer-form content to, among other things, make the content searchable, identify relevant and/or interesting segments within the content, provide for and/or otherwise generate search results and/or coherent shorter-form summaries and/or highlights, enable new shorter-form audio listening experiences, and/or the like. Various aspects of the disclosed systems and methods may further enable relatively efficient transcription and/or indexing of content libraries at scale, while also generating effective formats for users interacting with such libraries to engage with search results.

19 Claims, 9 Drawing Sheets

Related U.S. Application Data

(60) Provisional application No. 62/737,672, filed on Sep. 27, 2018.

(51) Int. Cl.
*G10L 17/00* (2013.01)
*G10L 25/63* (2013.01)
*G10L 25/81* (2013.01)
*G10L 25/90* (2013.01)

(56) References Cited

U.S. PATENT DOCUMENTS

| | | |
|---|---|---|
| 2004/0006748 A1 | 1/2004 | Srivastava et al. |
| 2004/0062367 A1 | 4/2004 | Fellenstein et al. |
| 2008/0177536 A1 | 7/2008 | Sherwani et al. |
| 2009/0204399 A1* | 8/2009 | Akamine ............ G10L 15/1822 704/235 |
| 2010/0318537 A1 | 12/2010 | Surendran et al. |
| 2013/0185303 A1* | 7/2013 | Ceusters ................ G06F 16/35 707/737 |
| 2013/0226930 A1 | 8/2013 | Arngren et al. |
| 2014/0074471 A1* | 3/2014 | Sankar .................... G10L 17/02 704/E17.001 |
| 2015/0279390 A1 | 10/2015 | Mani |
| 2016/0027442 A1 | 1/2016 | Burton et al. |
| 2016/0162476 A1* | 6/2016 | Munro ................. G06F 40/137 704/9 |
| 2016/0283185 A1 | 9/2016 | McLaren et al. |
| 2016/0284354 A1 | 9/2016 | Chen et al. |
| 2017/0091154 A1* | 3/2017 | Eppolito ............... G06V 20/30 |
| 2017/0147544 A1 | 5/2017 | Modani et al. |
| 2017/0169816 A1 | 6/2017 | Blandin et al. |
| 2017/0177715 A1* | 6/2017 | Chang ..................... G06N 5/04 |
| 2017/0199934 A1* | 7/2017 | Nongpiur ................ G10L 25/51 |
| 2017/0277784 A1* | 9/2017 | Hay ...................... G06F 16/683 |
| 2017/0323643 A1* | 11/2017 | Arslan .................. G10L 19/018 |
| 2018/0060289 A1* | 3/2018 | Grueneberg ......... H05K 999/99 |
| 2018/0308519 A1 | 10/2018 | Chik et al. |
| 2019/0121851 A1* | 4/2019 | Shires .................... G10L 21/10 |
| 2019/0180175 A1 | 6/2019 | Meteer et al. |

OTHER PUBLICATIONS

Hori, Chiori, and Sadaoki Furui. "A new approach to automatic speech summarization." IEEE Transactions on Multimedia 5.3 (2003): 368-378. (Year: 2003).*

Furui, Sadaoki, et al. "Speech-to-text and speech-to-speech summarization of spontaneous speech." IEEE Transactions on Speech and Audio Processing 12.4 (2004): 401-408. (Year: 2004).*

Tiun, Sabrina, Rosni Abdullah, and Tang Enya Kong. "Automatic topic identification using ontology hierarchy." Computational Linguistics and Intelligent Text Processing: Second International Conference, published in 2001. (Year: 2001).*

"SCANMail: Audio Navigation in the Voicemail Domain." Proceedings of the First International Conference of Human Language Technology Research. Bacchiani, et al. 2001 (3 pgs).

"Extractive Speech Summarization Using Rhetorical Structure Modeling." IEEE Transactions of Audio Speech and Language Processing. Zhang, et al. Aug. 6, 2010. (11 pgs).

Non-Final Office Action Issued in U.S. Appl. No. 16/584,893. Mar. 15, 2021. (45 pgs).

Notice of Allowance Issued in U.S. Appl. No. 16/584,893. Jul. 22, 2021. (7 pgs).

* cited by examiner

AUDIO CONTENT PROCESSING SYSTEMS AND METHODS

RELATED APPLICATION

This application is a continuation of U.S. patent application Ser. No. 16/584,893, filed on Sep. 26, 2019, and entitled "Audio Content Processing Systems and Methods," which claims the benefit of priority under 35 U.S.C. § 119(e) to U.S. Provisional Patent Application No. 62/737,672, filed Sep. 27, 2018, and entitled "Audio Content Processing Systems and Methods," both of which are hereby incorporated by reference in their entireties.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to systems and methods for processing content. More specifically, but not exclusively, the present disclosure relates to systems and methods for analyzing and processing audio content to generate shorter-form audio content and/or associated content information and/or to improve content search operations.

Despite the widespread proliferation of electronic content platforms and channels, audio content remains relatively difficult for individuals to discover and/or engage with. Audio content may be less amenable to searching and/or browsing than other content types such as visual media (e.g., text, image, and/or video content, etc.). Additionally, many audio content formats are relatively long in duration. Using conventional platforms, users may not be readily able to receive highlights and/or a summary of the content without listening through a majority of a longer-form audio file. For example, a podcast may typically be an hour or more in length on average, which may discourage certain individuals from engaging with podcast content. Embodiments of the disclosed systems and methods may provide for the generation of summaries and/or other information associated with longer-form audio content, improving the ability of audio content to reach new audiences and providing existing audiences with new ways to search for and/or engage with the content.

Content owners may further have large repositories of audio content, but may have a relatively limited ability to leverage their content. For example, audio content libraries may not necessarily be transcribed and/or indexed with text, thereby making the libraries difficult to search. Various aspects of the disclosed systems and methods may enable relatively efficient transcription and/or indexing of audio libraries at scale, while also surfacing the most relevant and/or interesting results and/or creating an effective format for users to engage with in connection with search results. For example, by segmenting longer-form content into discrete shorter-form content and/or clips consistent with various aspects of the disclosed embodiments, search results may become easier to discover, engage with, and/or distribute.

Consistent with certain embodiments of the disclosed systems and methods, techniques are described that may facilitate processing, analyzing, and/or structuring of longer-form audio content to, among other things, make the content searchable, identify more relevant and/or interesting segments within the content, provide for and/or otherwise generate search results and/or coherent short-form summaries and/or highlights (e.g., providing a trailer and/or highlight reel for the longer-form audio content), and/or the like. In some embodiments, artificial intelligence methods may be used in connection with content processing, analyzing, and/or structuring including, without limitation, one or more machine learning and/or natural language processing techniques. In various embodiments, aspects of the disclosed systems and methods may further facilitate the generation of shorter-form content and/or segments based on the contents of a plurality of longer-form audio content files, such as the audio track of video files.

Audio content that may be processed, analyzed, and/or structured in connection with aspects of the disclosed embodiments may comprise a variety of types of audio content including, for example and without limitation, one or more of podcasts, radio shows and/or broadcasts, interviews, phone and/or meeting recordings, and/or the like. In addition, although various embodiments are described in connection with processing, analyzing, and/or structuring audio content, it will be appreciated that aspects of the disclosed systems and methods may be used in connection with a variety of content types and/or formats.

Conventional approaches to audio content organization and/or curation may involve human curators and/or editors listening through content in its entirety and manually constructing shorter-form pieces. Various embodiments disclosed herein may allow for automatic generation of recommended shorter-form content segments, summaries, and/or highlights, thereby streamlining the editing and/or creation process (e.g., by providing a human curator with recommended shorter-form segments, summaries, and/or highlights to accept/reject) in connection with their curation efforts. In addition, aspects of the disclosed embodiments may assist human curators in the creation of shorter-form content. For example, machine-generated shorter-form content may be presented to a human curator as a starting point for content creation, thereby reducing the time and/or effort otherwise involved in content production.

Further embodiments disclosed herein provide for parameterization of automated content processing. For example, a user may set, among other things, a target size and/or format for shorter-form segments, highlights, and/or summaries. Using various disclosed embodiments, the user may thus have shorter-form segments, highlights, and/or summaries "made to order" based on the target parameters rather than the user manually creating shorter-form segments, highlights, and/or summaries themselves.

Additional embodiments of the disclosed systems and methods may provide for a variety of useful content interaction user experiences. For example, shorter-form content may enable voice-first experiences on smart speakers, headphones, in-car systems, and/or other voice-enabled devices. Various embodiments disclosed herein may take users beyond relatively simple question-and-answer or command-control interactions on voice-enabled devices to more interactive content-driven exploration of relevant audio content.

Consistent with certain embodiments disclosed herein, a method of processing audio content may include receiving a first audio content file and generating, based on the first audio content file, a text file comprising transcribed text corresponding to the first audio content file using any suitable audio-to-text transcription process(es). One or more words, multiple word phrases, entities, and/or the like may be extracted from the generated text file, providing parameters for analyzing the content of the file, identifying the most relevant and/or interesting segments, enhancing searchability of the file, and/or the like.

A plurality of content segments may be identified in the text file based, at least in part, on the extracted words, phrases, entities, and/or the like. In some embodiments, one or more audio features may be extracted from the audio file (e.g., pauses, relative vocal volume, vocal pitch, vocal timbre, vocal emotion, emphasis vocal emphasis, vocal patterns, instrumental interludes, etc.). Extracted audio features may, alternatively and/or additionally, be used to identify segments in the content.

In some embodiments, identifying the plurality of segments in the text file may include identifying, based on the extracted one or more words, one or more topics. In some implementations, each segment of the plurality of segments may be associated with at least one topic of the identified one or more topics. In further implementations, each segment may not necessarily be associated with a topic that is of relevance and/or interest (e.g., segments associated with advertisements, introductions, conclusions, music, silence, etc.). In certain embodiments, one or more disambiguated and/or otherwise enriched secondary words, phrases, entities, and/or the like may be identified based on the extracted information and a relational taxonomy, ontology, and/or other libraries and used to identify topics.

A second audio content file may be generated comprising audio content from the first audio content file corresponding to at least a subset of the plurality of segments. In some embodiments, each topic of the identified one or more topics may be associated with at least one segment of the subset of segments. In some embodiments, the second audio content file may be generated in response to a request received from a system for a shorter-form content file associated with the first content file. The second audio content file may be transmitted to the requesting system in response to the received request.

Segments in the text file may be identified in a variety of ways and/or using a variety of techniques and/or processes and/or combinations thereof. In certain embodiments, the first audio content file may be analyzed to identify (e.g., uniquely and/or generically) and/or label one or more speakers. The plurality of segments in the text file may be further identified based, at least in part, on the associated labeled speakers. In further embodiments, segments may be identified based on one or more of a lexical feature, a grammatical feature, and a syntactic feature of the text file. Certain less relevant segments (e.g., segments that can be filtered) such as, for example and without limitation, an introduction segment, an advertisement segment, and a conclusion segment, may be identified and excluded from the subset of segments used to generate the second audio content. In further embodiments, segments may be scored based on determined relevance and/or representativeness relative to the first audio content file, determined cohesiveness, determined diversity, and/or the like, and the subset of the plurality of segments may include segments associated with scores meeting a threshold.

As discussed above, one or more audio features may be extracted from the first audio content file and may be used to identify segments in the first audio content file. In further embodiments, one or more extracted audio features may further be used to label portions of the audio content file based on identified speakers. Consistent with embodiments disclosed herein, the extracted and/or analyzed audio features may comprise, for example and without limitation, one or more pauses, relative vocal volume, vocal pitch, vocal timbre, vocal emotion, emphasis vocal emphasis, vocal patterns, instrumental interludes, and/or the like. It will be appreciated that certain embodiments of the content processing and analysis methods disclosed herein may be used to analyze audio content using, at least in part, text transcription analysis of the audio content, audio feature analysis of the audio content, and/or any combination of text and/or audio analysis.

In some embodiments, a querying system may issue a search request comprising one or more search query terms. A relevance of the one or more search query terms relative to at least one segment may be determined, and an associated response that includes the generated second audio content file, a text file corresponding to the second audio content file, and/or associated metadata (e.g., keywords, key phrases, and/or entities included in the second audio content file) may be returned in response to the search request. In certain embodiments, in connection with generating a response to the search request, the one or more search query terms may be compared against a content graph generated based on the first audio content file.

In certain embodiments, the aforementioned method may be performed by an audio content processing system and/or any other suitable computing system and/or implemented using a non-transitory computer-readable medium storing associated executable instructions.

BRIEF DESCRIPTION OF THE DRAWINGS

The inventive body of work will be readily understood by referring to the following detailed description in conjunction with the accompanying drawings, in which.

DETAILED DESCRIPTION

A description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings, wherein like parts may in some instances be designated by like numbers or descriptions. The components of the disclosed embodiments, as generally described and/or illustrated in the figures herein, could be arranged and designed in a wide variety of different configurations. Thus, the following description of the embodiments of the systems and methods of the disclosure is not intended to limit the scope of the disclosure, but is merely representative of possible embodiments of the disclosure. In addition, the steps of any method disclosed herein do not necessarily need to be executed in any specific order, or even sequentially, nor need the steps be executed only once, unless otherwise specified.

Embodiments of the disclosed systems and methods provide techniques for processing, analyzing, and/or structuring of longer-form content to, among other things, make the content searchable, identify relevant and/or interesting segments within the content, provide for and/or otherwise generate search results and/or coherent shorter-form summaries and/or highlights, and/or the like. Various aspects of the disclosed systems and methods may further enable relatively efficient transcription and/or indexing of content libraries at scale, while also generating effective formats for users interacting with such libraries to engage with search results.

Various embodiments of the disclosed systems and methods may further enable the processing and/or analysis of a wide variety of types of audio content and/or other multimedia content that includes extractable audio content including, for example and without limitation, one or more of podcasts, radio shows and/or broadcasts, interviews, audiobooks, phone and/or meeting recordings, and/or the like. Embodiments of the disclosed systems and methods may, in some implementations, establish a common format for such audio content and/or facilitate a variety of new ways for users to explore and/or otherwise interact with audio content including, without limitation, using an audio creation dashboard, an audio search interface, and/or voice-first user interfaces.

Content Processing Overview

Figure 1:
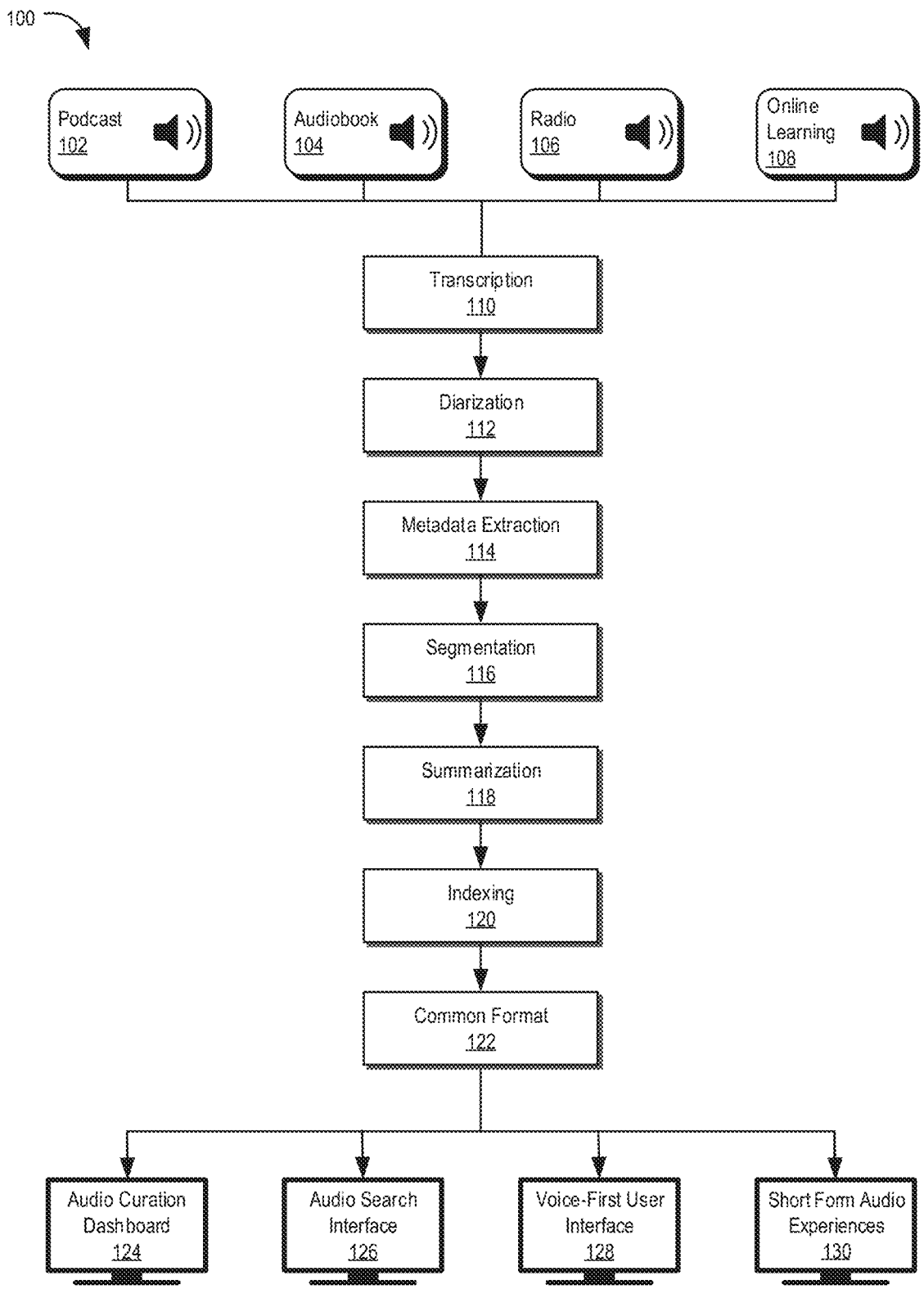
FIG. 1 illustrates a diagram showing an example of content processing consistent with certain embodiments of the present disclosure.

FIG. 1 illustrates a diagram 100 showing an example of content processing consistent with certain embodiments of the present disclosure. As shown, longer-form content 102-108 such as, for example and without limitation, podcast content 102, audiobook content 104, radio show and/or broadcast content 106, and/or online learning content 108, may be ingested into the content processing system and/or workflow implementing various aspects of the disclosed embodiments. It will be appreciated that a variety of types of audio content may be processed using various embodiments of the disclosed systems and methods including, for example and without limitation, corporate, public, and/or governmental recordings, live event and/or webinar recordings, healthcare-related recordings such as recordings of patient visits, court recordings, and/or any other type of recorded audio in any suitable format. In addition, although various embodiments are described herein in connection with processing, analyzing, and/or structuring audio content 102-108, it will be appreciated that aspects of the disclosed systems and methods may be used in connection with a variety of content types and/or formats.

Audio-to-text transcription 110 methods may be used to transcribe the longer-form content 102-108 into associated text. For example, in various embodiments, automatic speech recognition ("ASR") methods may be used to transcribe audio content into associated text. Diarization 112 may be used to identify and/or otherwise label distinct speakers in the longer-form content 102-108. For example, diarization 112 may label speakers in transcribed audio text with distinct speaker labels independent of a specific name and/or identity. In addition, speaker identification may be used to label distinct speakers with specific identities and/or names.

Metadata extraction 114 may be performed by analyzing text, which may or may not be diarized, to extract one or more keywords, phrases, topics, categories, semantic relations, names, and/or other entities from the text. In some embodiments, metadata extraction 114 may comprise information extraction and/or content classification processes. Information extraction may comprise extracting one or more keywords, key phrases, semantic relations, names, and/or other entities from text of transcribed audio. Content classification may comprise identification of topics, genres, and/or content types based on the content of the text and/or associated extracted information.

Text segmentation 116 methods may be employed to segment the text into relatively high-level topics and/or sub-topics. In some embodiments, the topics may comprise single word and/or phrase topics describing the associated longer-form content and/or portions thereof. In further embodiments, longer-form content may be segmented into shorter-form content that may comprise, for example, one or more shorter-form content segments and/or clips. As used herein and described in more detail below, segments and/or shorter-former segments and/or clips may, in certain instances, refer to and/or otherwise comprise relevant and/or phrases within the longer-form content that convey a point and/or provide context relating to one or more of a keyword, phrase, name, and/or other searchable terms relevant to the longer-form content.

Summarization 118 methods may be used to extract one or more keywords, phrases, topics, categories, semantic relations, names, and/or other entities from each generated segment and/or the full text. Individual phrases, sentences, and/or segments may be scored and/or ranked to generate one or more cohesive shorter-form summaries and/or to provide context for relevance with respect to the search.

Indexing 120 methods may index generated summaries and/or segments, which may also include associated metadata (e.g., title, publishing date, keywords and/or key phrases, segment and/or keyword scores, and/or other useful information extracted and/or otherwise derived from the content) for search. During indexing, each file may be stored in a structured manner. For example, files may be stored in a manner such that each part of a stored file and/or associated information (e.g., summary, segments, metadata, and/or the like) is identifiable and/or relatively straightforwardly delineable. In some embodiments, parts of a stored file and/or associated information may be stored in an inverted index to facilitate relatively fast full text searches. For example, in certain embodiments, unique words in all indexed text files may be mapped to all the text files they occur in, allowing for filtering. In some embodiments, an inverted index may employ statistical analysis to help determine which words in a search phrase are statistically more prominent and/or otherwise more important and in what documents they are more prominent and/or otherwise more important than others.

In some embodiments, processed audio content, which may include generated summaries and/or segments, may be formatted 122 in a common format allowing to allow for streamlined interaction with the content in a variety of contexts. As illustrated, processed audio content may be used in connection with a variety of user interactive applications and/or contexts, including audio curation via an interactive dashboard 124, search via a suitable search interface 126, using interactive voice-first user interfaces 128, and/or shorter-form audio experiences 130.

Chapterization and Topic Segmentation

Certain embodiments may employ artificial intelligence methods including, for example, machine learning and/or natural language processing techniques, to enhance the searchability of content, extract metadata (e.g., keywords, key phrases, named entities, topics, and/or the like), and/or the generation of shorter-form content (e.g., segments, summaries, highlights, and/or the like). As used herein, shorter-form content may, in certain instances, refer to shorter-form content segments, summaries, highlights, other information, and/or any combination thereof that may be derived from, generated based on, and/or otherwise associated with longer-form content.

Various artificial intelligence methods may be used to segment longer-form content into relatively high-level topics and/or sub-topics. In some embodiments, the topics may comprise single word and/or phrase topics describing the associated longer-form content and/or portions thereof. In certain embodiments, each high-level topic and/or sub-topic may comprise one or more paragraphs describing the associated topics. In further embodiments, one or more of the high-level topics and/or sub-topics may be associated with one or more paragraphs of content that may related and/or otherwise pertain to an associated subject and/or set of subjects. In various embodiments, segmenting and/or otherwise chapterizing longer-form content into topics and/or sub-topics may, among other things, facilitate the generation of shorter-form content and/or summaries, improve search indexing and/or ranking, provide for improved interaction with search results, and/or the like.

In certain embodiments, to identify individual topics, supervised learning techniques using trained deep neural networks may be employed. In some embodiments, the neural networks may be trained to detect topic boundaries using curated training datasets. In further embodiments, in addition to and/or alternative to supervised learning techniques, unsupervised learning methods using lexical cohesion may be employed. Topic identification using supervised and/or unsupervised learning techniques consistent with various disclaimed embodiments may take into account various signals derived from the audio content, transcript and/or related third-party metadata (e.g., lexical, grammatical, and/or syntactic features of words), text embeddings, sequences of text units, prosodic features, sentiments and/or emotions, speaker turns, speaker identities, time and/or duration of various text units, pauses, punctuation, cue phrases, co-references and/or anaphora, and/or any other suitable types of inputs, signals, and/or other information to identify topics associated with transcribed text.

Content Type and Topic Classification

In some embodiments, longer-form content and/or associated transcribed text may be categorized (e.g., automatically categorized) by content type, topic, and/or the like. A content type may comprise a type and/or format of content such as, for example and without limitation, interviews, news, speeches, educational narratives, story-telling narratives (e.g., fictional and/or non-fictional), and/or the like. In certain embodiments, this information may be used in connection with a variety of content processing activities including, for example and without limitation, segmenting longer-form content, content summarization, metadata extraction and/or indexing for search, and/or the like.

In certain embodiments, topic vocabulary may be organized in a directed acyclic graph ("DAG"), although other suitable organizational methods and/or topologies may also be used. In some embodiments, a DAG may capture the notion of topic granularity and/or relatedness. For example, the topic "biathlon" may be a subtopic of "winter sports" and be related to a topic of "Olympic games." In some embodiments, information relating to content type and/or topics may be further used for generating various derived information including, for example, and without limitation, clips, summaries, highlights, and/or the like.

Supervised learning techniques (e.g., supervised learning techniques using neural networks trained using curated training datasets) may be used to identify content types and/or classify associated topics. In various embodiments, signals and/or information derived from audio content and/or associated transcripts such as, for example and without limitation, lexical, grammatical, and/or syntactic features of words, text embeddings, speaker turns, speaker identities, audio features, time and/or duration of various text units, cue words and/or expressions, and/or the like, may be used to identify and/or otherwise classify content type and/or associated topics. In addition, in some embodiments, metadata associated with the original longer-form content may also be used in connection with identifying content type and/or classifying associated topics. For example, metadata associated with an audio content file and/or associated transcript such as source, series name, host name, content tile, date of release, and/or the like may be used in connection with content type identification and topic classification.

Keyword, Key Phrase, and Entity Extraction

Consistent with certain disclosed embodiments, relevant keywords and/or phrases and/or entities may be extracted from transcripts of audio content using suitable methods and/or techniques. In certain embodiments, entities may comprise one or more objects, persons, names, geographical locations, organizations, products, and/or the like. In some embodiments, relevant keywords and/or phrases and/or entities may be extracted from transcripts of audio content using machine learning techniques, although other suitable methods may also be used. Extracted keywords, phrases, and entities may be used in a variety of contexts consistent with various disclosed embodiments including, for example and without limitation, content discovery and/or linking, search, and/or summarization.

In some embodiments, key word and/or phrase and/or entity extraction methods may comprise tag selection, tag normalization, and/or tag ranking processes. In connection with tag selection, candidate tags may be generated and/or otherwise identified by analyzing transcribed audio content and identifying candidates based on noun phrases and/or entities included therein.

A set of rules and/or filters may be applied to eliminate less informative, less relevant, and/or otherwise noisy candidate tags. In certain embodiments, tags may be filtered using a variety of techniques and/or based on a variety of criteria. For example, in some embodiments, candidate tags may be filtered by identifying whether a candidate tag includes a certain part-of-speech and/or character pattern(s), whether a candidate tag is included in a defined list of uninformative, less relevant, and/or noisy tags (e.g., a black list) and/or a controlled vocabulary, whether a candidate tag is semantically related to surrounding context, whether a candidate tag is used at a threshold or below a threshold level of frequency, and/or the like. Candidate tags included in less relevant content sections and/or segments such as, for example and without limitation, advertisements, non-substantive dialogues, announcements, and/or the like, may also be filtered.

Tag normalization may be performed on the remaining candidate tags. In some embodiments, tag normalization may comprise recovering capitalization, recovering plurality, and/or identifying canonical form (e.g., "Einstein" →"Albert Einstein") based on available dictionaries and/or other contextual information.

Normalized candidate tags may be ranked by relevance based on a variety of suitable variables. For example, information regarding a candidate tag's prevalence in an audio transcription, positional information within the audio transcription, occurrences of tags in associated content metadata, and tag trendiness that, in some embodiments, may be determined using information (e.g., third party information) indicating current topic trends and/or popularity, and/or the like may be used in connection with ranking normalized candidate tags by relevance.

Keyword, Key Phrase, and Entity Linking

In various embodiments, entities, keywords, and/or key phrases may be mapped/linked to unique identities in one or more knowledge bases and/or other available information repositories. In some embodiments, mapping keywords, key phrases, and/or entities to identities may disambiguate their meaning and/or otherwise enrich them with relationships, properties, metadata, and/or other information. In certain embodiments, keyword, key phrase, and/or entity linking may use context and/or other features from the content where entities, keywords, and/or key phrases occur and compare them to the context and/or other features from external sources where the knowledge base identities occur. Linking determinations may, in some implementations, use machine learning models and/or algorithms.

Content Linking and Content Graphs

In certain instances, audio content may not necessarily include links between files (e.g., hyperlinks and/or the like) and/or easily accessible metadata, making it more difficult to discover other files and/or content relating to similar topics and/or subjects. Consistent with various embodiments of the disclosed systems and methods, information may be extracted from audio content that may facilitate improved identification of files, content, topics, and/or subjects that relate to and/or are otherwise similar to the analyzed content. Associated relationship mappings may be generated using, for example, machine learning techniques.

Figure 2:
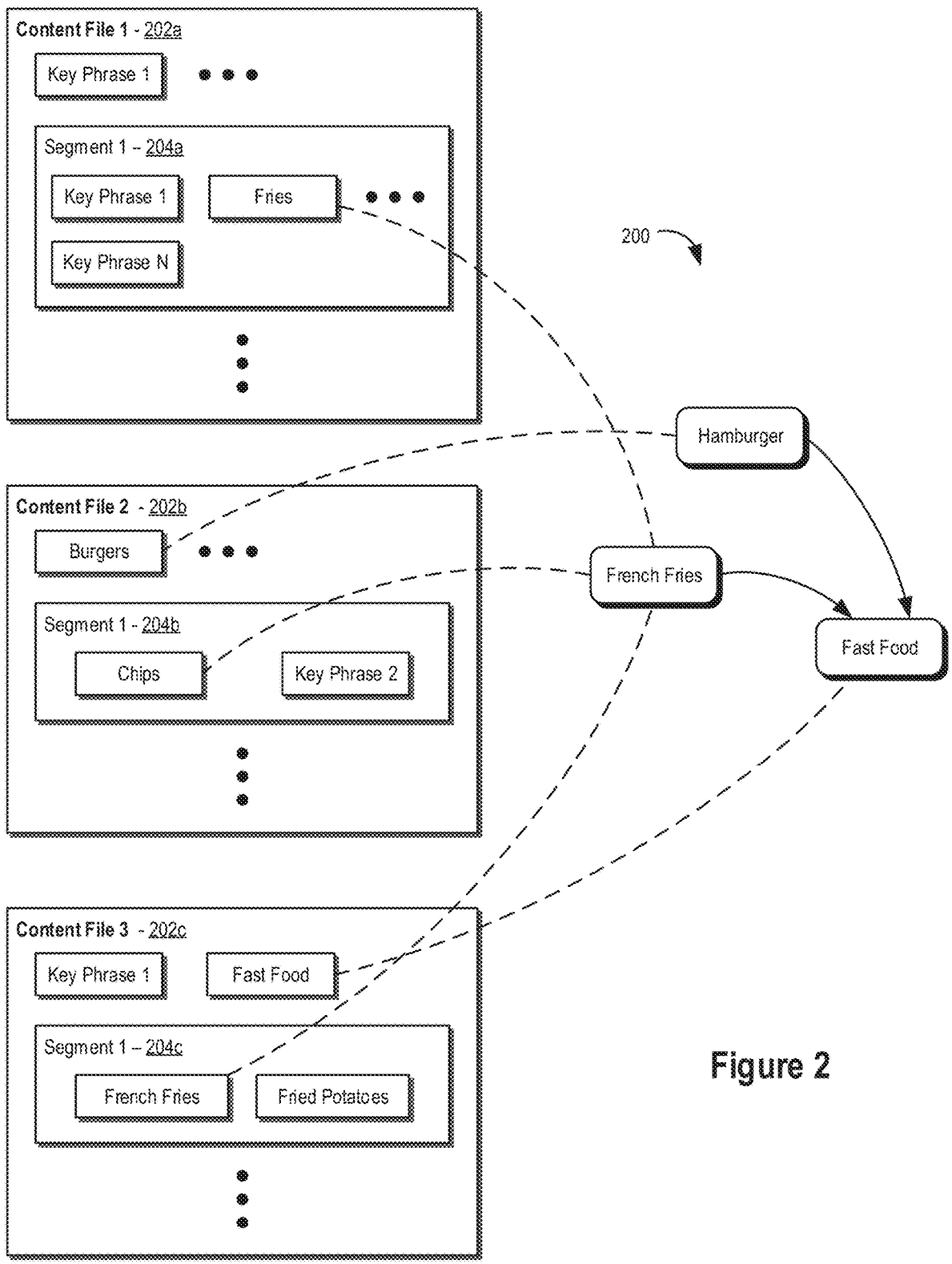
FIG. 2 illustrates an example of a content linking graph consistent with certain embodiments of the present disclosure.

In some embodiments, keywords, key phrases, identities linked to entities, and/or associated metadata and/or other information may be used to identify links and/or associated relationships (e.g., relationships between longer-form content, files, series, shorter-form content, topics, segments, summaries, key words, key phrases, entities, and/or the like) to build a content graph. FIG. 2 illustrates an example of a content graph 200 consistent with certain embodiments of the present disclosure. In certain embodiments, a content graph may, among other things facilitate improved audio content search, content recommendation, content relevance and/or importance scoring, and/or associated functionalities.

Consistent with embodiments disclosed herein, keywords and/or key phrases may be expanded and/or otherwise associated with related keywords and/or key phrases using suitable contextual information, libraries, and/or key word and/or key phrase taxonomies and/or ontologies. Associating keywords and/or key phrases with related keywords and/or key phrases may improve audio search and/or recall, among other functionalities. For example, the keyword "fries" may be expanded to include aliases "chips," "French fries," and "fried potatoes," the more general keyword and/or concept "fast food," and/or other instances of the more general keyword and/or concept such as "burgers," "chicken wings," and/or the like.

Keyword and/or key phrase-to-entity and/or associated metadata mappings may further be used in connection with keyword and/or key phrase normalization and/or aggregation methods. Keyword and/or key phrase normalization may identify and/or otherwise map more commonly used keyword and/or key phrases with less commonly used and/or more esoteric keywords and/or key phrases. For example, the keywords and/or key phrases "chips" and/or "fried potatoes" may be normalized to the keyword "French fries."

Keyword and/or key phrase aggregation may collapse and/or otherwise aggregate more specific keywords and/or key phrases with more general key words and/or key phrases. For example, the keywords and/or key phrases "chips," "French fries," "fried potatoes," "burgers," "chicken wings," and/or the like, may be aggregated into the more general key phrase "fast food."

As illustrated in FIG. 2, one or more audio content files 202a-202c and/or associated text transcriptions may be analyzed to extract one or more associated keywords and/or key phrases. In some embodiments, the extracted keywords and/or key phrases may be generally associated with the audio content files 202a-202c. In further embodiments, the extracted keywords and/or key phrases may alternatively or in addition to be associated with one or more constituent segments 204a-204c of the audio content files 202a-202c. As shown, in some embodiments, a content graph 200 may be generated associated with the one or more audio content files 202a-202c and/or constituent segments 204a-204c based on the extracted keywords and/or key phrases and available contextual information, libraries, keyword and/or key phrase taxonomies and/or ontologies, and/or the like. In certain embodiments, extracted keywords and/or key phrases associated with the content graph 200 may be expanded, aggregated, normalized, and/or otherwise associated with related keywords and/or key phrases.

Content Segmentation

Longer-form content may be segmented into shorter-form content that may comprise, for example, one or more shorter-form content segments and/or clips. As used herein, segments and/or shorter-former segments and/or clips may, in certain instances, refer to and/or otherwise comprise relevant sentences (e.g., individual sentences or a collection of sentences), dialogues between speakers, and/or phrases within the longer-form content that convey a point and/or provide context relating to one or more of a keyword, phrase, name, and/or other searchable terms (e.g., a term of interest) relevant to the longer-form content.

Figure 3:
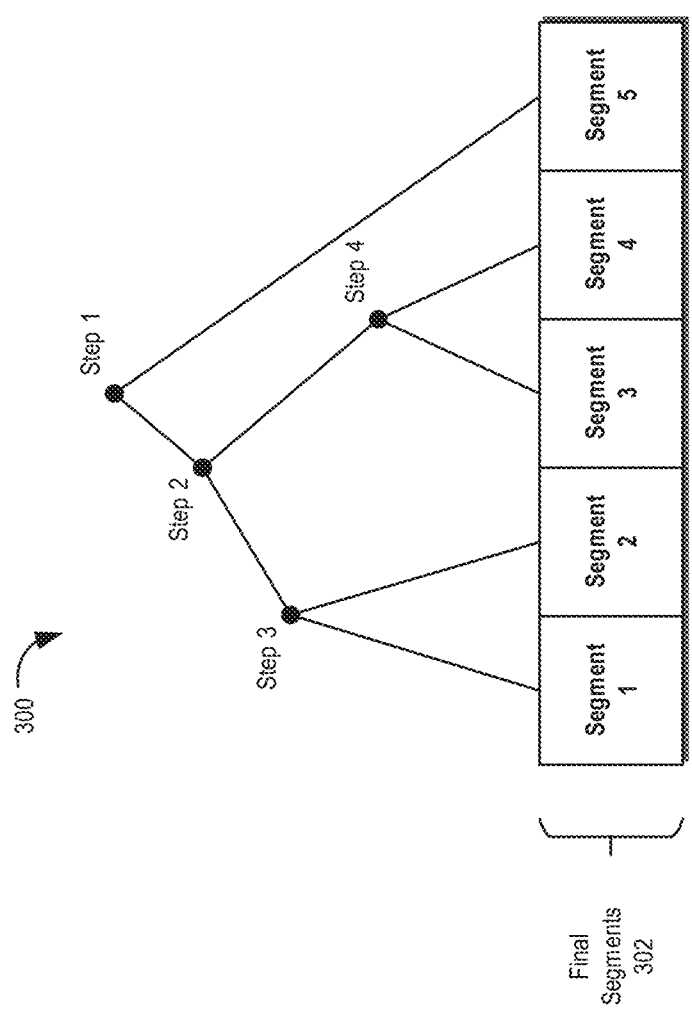
FIG. 3 illustrates a conceptual diagram showing an example of content segmentation consistent with certain embodiments of the present disclosure.

FIG. 3 illustrates a conceptual diagram 300 showing an example of content segmentation consistent with certain embodiments of the present disclosure. Content segmentation methods consistent with some embodiments may iteratively split larger content and/or segments (e.g., longer-form content and/or segments) into constituent smaller content and/or segments (e.g., shorter-form content and/or segments), until one or more final constituent segments 302 are realized.

In some embodiments, with each iteration, the splitting point within the content and/or segment may be determined by identifying points in the content and/or segments which preserve, maximize, and/or otherwise do not significantly impact cohesion in the resulting shorter-form content and/or segments. In some embodiments, a splitting point may be determined and/or otherwise identified by assessing the cohesion of a segment before and after a split at a particular point based on a variety of signals. For example, an interrogative sentence followed by a response may be a potential splitting point that preserves segment cohesion. In a non-limiting example, a proposed segment may include the following dialogue between a host and a guest speaker:

HOST: "Are there any rules or practices that you also hold sacred or important for your writing process?"

GUEST: "Some of them are just things for me. For example, most of the time, not always, I will write my first draft using a fountain pen, because I actually enjoy the process of writing with a fountain pen."

The above example may form a coherent segment as it starts with an interrogative sentence from the host and is followed by a response from the guest. In some embodiments, a question and answer segment like the above example may be identified using, at least in part, speaker diarization information and/or sentence type classification.

In another non-limiting example, a proposed segment may include the following numbered sentences of dialogue:

SPEAKER 1: "(1) The German Chancellor Angela Merkel has announced the current fourth term in office will be her last marking the end of an era in which she's dominated European politics. (2) Mrs. Merkel, whose fragile coalition has been rocked by two recent poll disasters told a news conference in Berlin she'd also stand down as head of her center right party this December. (3) There are fears that efforts to fight malaria have slowed and the disease could return in countries where it had been in decline. (4) But now scientists have found an unlikely ally in the battle to combat malaria: dogs that can detect it by sniffing people's clothes.

SPEAKER 2: "(5) They have sniffer dogs for detecting fruit and vegetables and drugs so I thought well if they can do that maybe they can detect malaria parasites in people that aren't sick."

In the above example, sentences 1 and 2 may form a cohesive segment as they share the usage of the same and/or similar and/or semantically related terms relating to Angela Merkel and politics including, for example: Merkel, German, Berlin, coalition, politics, center right party. Sentences 3-5 may form another cohesive segment related to malaria as they share usage of the same and/or similar and/or semantically related terms relating to malaria and/or disease: malaria, disease, sniffing, dogs, parasites, sick. Consistent with various embodiments of the disclosed systems and methods, the differences in topics and/or vocabulary used in sentences 1 and 2 when compared to sentences 3-5 may be used to identify potential splitting points between segments (i.e., a segment comprising sentences 1 and 2 and sentences 3-5) that preserves the cohesiveness of the resulting segments.

In further embodiments, determining a degree of cohesion of a resulting segment may be based on one or more signals included in, associated with, and/or derived from the audio content including, for example and without limitation, one or more of lexical, grammatical, and/or syntactic features of words, text embeddings, sequences of text units, audio and/or prosodic features, sentiments and/or emotions, speaker turns, speaker identities, time and/or duration of various text units, pauses, punctuation, cue phrases co-references, anaphora, and/or the like. Iterations may terminate once a threshold number of segments and/or longer-segments may no longer be readily further segmented without undesirably reduced segment cohesion.

As discussed above, segmentation may proceed iteratively. For example, in the illustrated diagram 300, a longer-form audio content comprising Segments 1-5 may, in a first segmentation step, be split into two segments: a first segment comprising Segments 1-4 and a second segment comprising Segment 5. In a second segmentation step, the first segment may be further split into a third segment comprising Segments 1 and 2 and a fourth segment comprising Segments 3 and 4. In a third segmentation step, the third segment may be split into Segment 1 and Segment 2. Finally, in a fourth segmentation step, the fourth segment may be split into Segments 3 and 4, resulting in five final segments 302.

It will be appreciated that a variety of variables may be used to identify segments and/or segment an audio file. For example, the length of candidate segments (e.g., not too long, not too short), the coherence of candidate segments, and the independence of a candidate segments relative to surrounding segments, among other variables, may be considered in connection with segmentation processes consistent with various aspects of the disclosed embodiments.

Scoring and Ranking

In some embodiments, various information generated based on longer-form content including, for example, shorter-form content segments, clips, summaries, highlights, and/or other information, may be scored based on a likely relevance and/or importance to a user. For example, as discussed above, key phrases, keywords, and/or named entities may be extracted from shorter-form segments. Extracted information may be used to score a relative importance and/or relevance of a segment. Scoring of segments may be used, for example, in connection with summary and/or highlight generation, searching operations, and/or the like. In some embodiments, scoring of segments may be further based on relevance, interest, and/or importance in the context of the overall associated longer-form content.

In certain embodiments, a segment's relevance may be scored relative to the context of the overall associated longer-form content using machine learning processes. For example, in some embodiments, higher relevance scores may be associated with segments directed to a central topic, segments where a main guest and/or other identified speaker is talking, and/or the like. Lower relevance scores may be associated with less important content such as, for example, advertisements, announcements, introductions, conclusions, wrap-ups, small talk and/or off topic dialogue, and/or the like. In connection with certain search related methods described herein, scores may be used to increase and/or decrease the general relevance score of a segment indicating how well the segment matches a search query.

In some embodiments, the relevance and/or importance of audio content and/or associated constituent segments, that may be reflected in associated scoring, may be determined at various levels of granularity. For example, relevance and/or importance may be determined at a keyword and/or key phrase level within an audio content file and/or an associated segment, at the segment level within the audio content file, at the audio content file level within a category, series, cluster, and/or some other organizational subset, and/or the like.

Figure 4:
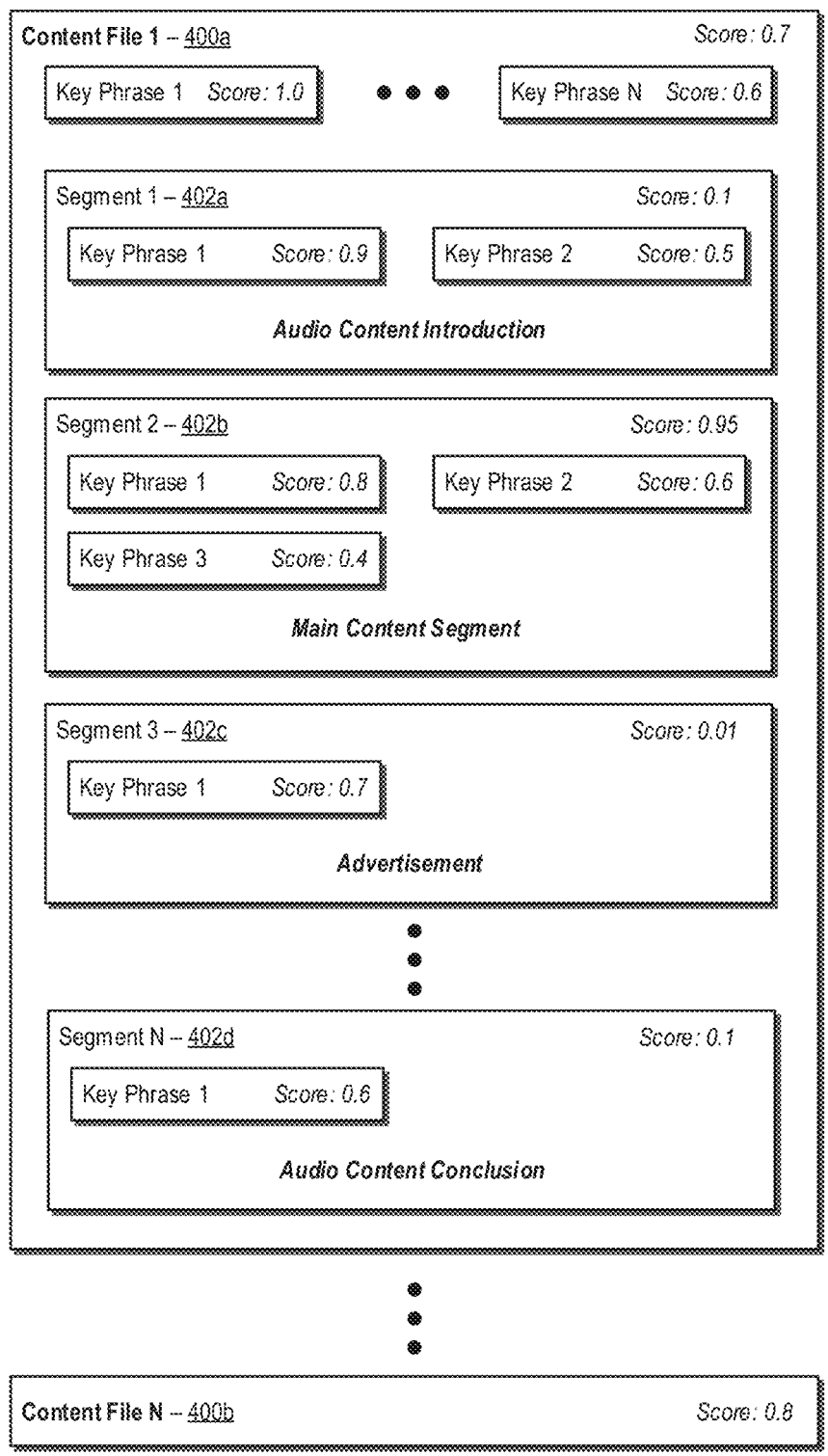
FIG. 4 illustrates an example of content scoring consistent with certain embodiments of the present disclosure.

FIG. 4 illustrates an example of content scoring consistent with certain embodiments of the present disclosure. As shown, the likely relevance and/or importance of audio content to a user may be scored at the file level 400*a*-400*b*, at the key phrase and/or keyword level, at the segment level 402*a*-402*d*, and/or at any other suitable hierarchal level. In this manner, scoring information may be used at different levels of content granularity with respect to associated audio content, thereby improving summary and/or highlight generation operations, search operations, and/or the like.

In certain embodiments, scoring may allow for easier identification of higher quality, relevant, and/or more important parts of content while discounting, filtering, and/or otherwise deemphasizing lower quality, less relevant, and/or less important parts of the content (e.g., advertisements, introduction segments, conclusion segments, announcements, lower quality segments, and/or the like). In connection with search operations, file, segment, keyword and/or key phrase and/or other content scores may be used in combination with overall relevance scores when responding to a user query to highlight and/or otherwise emphasize search term and/or phrase appearances in more informative and/or relevant parts of content while discounting occurrences in less informative parts. In connection with shorter-form content generation, scoring may be used to increase the likelihood of including more informative and/or interesting segments while reducing the likelihood of including less informative and/or interesting segments in generated shorter-form content.

In some embodiments, various information generated based on longer-form content including, for example, shorter-form content segments, clips, summaries, highlights, and/or other information, may be ranked based on a likely relevance and/or importance to a user. For example, key phrases, words, and/or named entities may be extracted from shorter-form segments. Extracted information may be used to rank a relative importance and/or relevance of a segment. Ranking of segments may be used, for example, in connection with summary and/or highlight generation, searching operations, and/or the like. Ranking of segments may further be based on relevance, interest, and/or importance in the context of the overall longer-form content.

Query Analysis

Certain embodiments may implement query analysis to return more relevant audio content in response to a user search query. In some embodiments, query analysis may include, for example and without limitation, keyword, key phrase, multiword expression, and/or title detection, and may be used to determine which part of an audio content file may be considered relatively more relevant to a query and/or how individual search terms are treated when responding to a search query. For example, query analysis may be used to determine a tolerable distance between individual search terms associated with content relevance, which search terms should co-occur in a segment in order for the segment to be identified as relevant, and/or the like.

Figure 5:
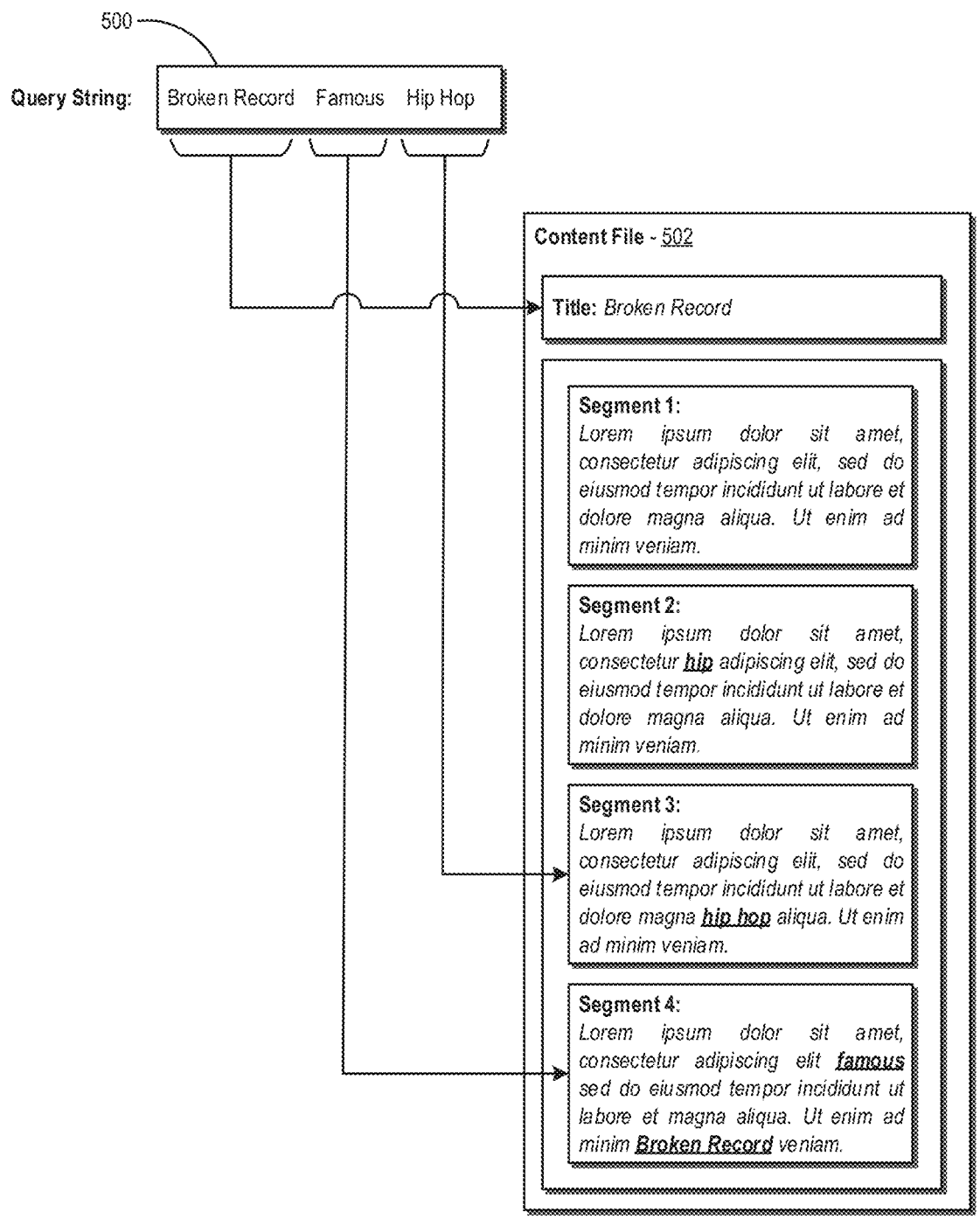
FIG. 5 illustrates an example of a query analysis process consistent with certain embodiments of the present disclosure.

FIG. 5 illustrates an example of a query analysis process consistent with certain embodiments of the present disclosure. In connection with the illustrated example, portions of a content file 502 that are given greater weight relative to other content portions when considered against a query string 500 are referenced by arrows, although other portions of the content file 502 may be still contribute to relevance scoring, albeit with smaller weight. As shown, a query string 500 including the terms "Broken Record Famous Hip Hop" may be analyzed relative to an audio content file 502 by searching to determine whether a title field includes the term "Broken Record." The presence of the Series title term "Broken Record" in the title field of the audio content file 502 may be afforded greater weight than its presence in other parts of the audio content file (e.g., an introduction and/or advertisement segment and/or the like).

In some embodiments, multiword expressions such as "hip hop" may be identified and queried against content in a manner that weighs both words occurring in a same segment without separation higher than occurrences in content with each constituent word in the expression appearing in different sections and/or with one or more intermediate words. Therefore, the occurrence of the term "hip hop" in Segment 3 of the illustrated content file 502 may be given greater weight than the occurrence of the isolated word "hip" in Segment 2. Various embodiments of the disclosed query analysis processes may use lookup tables, n-gram statistics, language models, natural language understanding, and/or other approaches and/or combinations thereof to improve content searching operations.

Content Summarization

Various disclosed embodiments may allow for the combination of one or more shorter-form content segments and/or clips into a summary and/or highlight reel of the longer-form content. In certain embodiments, human and/or synthesized speech segments (e.g., recorded and/or synthesized audio content) may be inserted in between and/or otherwise position in reference to the extracted shorter-form content segments that may, among other things, provide introductions to, transitions between, and/or other information relating to associated shorter-form content segments. Synthesized speech and/or other audio effects such as, for example, audio cues, sounds, fade ins, fade outs, branded audio insertions, and/or other audio and/or music effects may be used to merge audio segments into a cohesive whole and generate (e.g., generate automatically and/or with the aid of a human curator) a final product suited for listening.

To generate a shorter-form content summary of original longer-form content, prominent segments within identified topics and/or subtopics may be identified and combined together to form a final summary. In some embodiments, non-informative content such as advertisements, introductions, conclusions, announcements, and/or the like may be identified and removed from inclusion in any generated shorter-form summary content. To identify more prominent segments associated with identified topics, each segment's relative degree of informativeness, completeness, and/or overall quality may be determined based, at least in part, on information derived from the original audio content, transcript, and/or related metadata (e.g., third party metadata).

Figure 6:
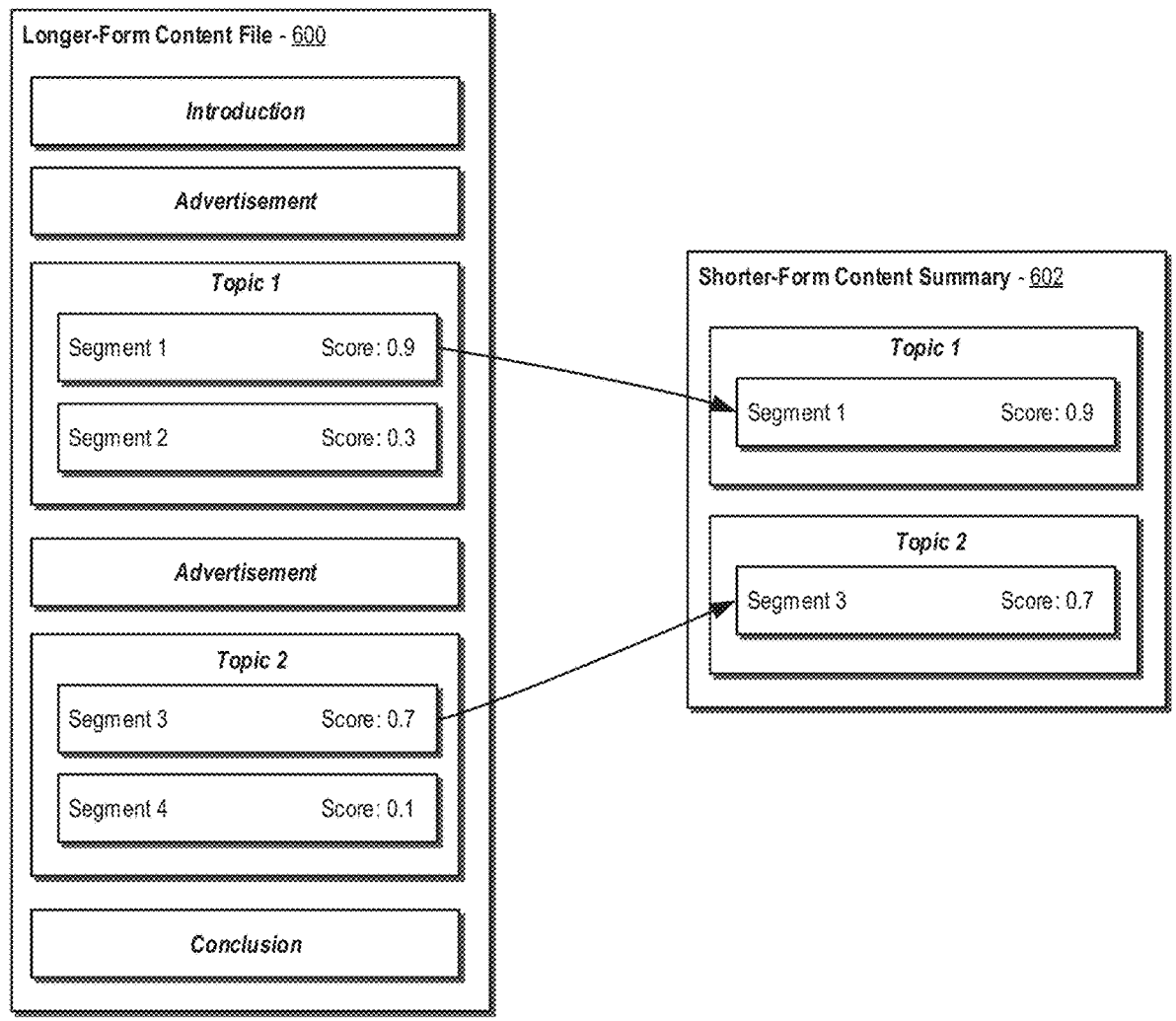
FIG. 6 illustrates an example of content summarization consistent with embodiments of the present disclosure.

FIG. 6 illustrates an example of content summarization consistent with certain embodiments of the present disclosure. As illustrated, a longer-form content file 600 and/or associated transcribed text may be analyzed to identify potentially less-informative content portions such as introductions, advertisements, and/or conclusions, as well as potentially more informative topics and/or associated content segments. Identified segments may be analyzed and/or scored consistent with segment relevance scoring processes described herein. Segments associated with a threshold score may be included in and/or otherwise combined into a shorter-form content summary 602. In some embodiments, segments associated with a threshold score may be included in the shorter-form content summary 602 regardless if other segments associated with the same topic are also included in the shorter-form content summary 602. In further embodiments, segments associated with the highest threshold score in each identified topic may be included in the shorter-form content summary 602. For example, in the illustrated content summarization process, the most relevant segment based on associated scoring from each topic included in the longer-form content file 600 may be included in the shorter-form content summary 602.

Scoring used in connection with topic and/or segment identification for inclusion in a shorter-form content summary may take into account a variety of signals including, without limitation, one or more of a segment's semantic similarity to a topic and/or the associated longer-form and/or full length content; the freshness of content within a segment; a segment's relative importance as indicated by a number of important concepts, keywords, key phrases, and/or entities within a segment, time, and/or duration of the associated transcribed text; a segment's completeness as indicated by vocabulary overlap, co-references, speaker turns and/or identifies, lexical and/or grammatical patterns, and/or punctuation; a segment's overall quality based on cue phrases, time, duration, and/or the like of the associated transcribed text, speaker turns, audio features, etc.; and/or the like.

In some embodiments, automated content summarization may be managed, at least in part, by one or more user specified conditions and/or parameters. For example, a user may set, among other things, a target size and/or format for shorter-form segments, highlights, and/or summaries, a number of topics included in generated summaries, a number of associated segments for each included topics, a threshold ranking, scoring, and/or relevance level for segment inclusion in a summary, and/or the like. Using various disclosed embodiments, the user may thus have shorter-form segments, highlights, and/or summaries "made to order" based on the target parameters.

Speaker Diarization and Identification

In certain embodiments, speaker diarization may be performed on longer-form audio content to identify distinct speakers. For example, speaker diarization consistent with various aspects of the disclosed embodiments may partition the longer-form audio content into segments according to distinct speakers and/or speaker turns independent of any specific speaker identity (e.g., labeling speakers generically as "Speaker A," "Speaker B," and/or the like). In some embodiments, speaker diarization may enhance the quality of segmenting of the longer-form content and/or topic identification and/or delineation.

In further embodiments, the identities of individual distinct speakers may be identified and/or otherwise recognized using speaker identification and/or voice recognition techniques. For example, speaker characteristic features may be extracted from audio and/or other sources and machine learning approaches may be subsequently applied to determine an identity of the diarized speakers and/or a subset thereof. In some embodiments, speaker identification and/or recognition may enhance the quality of segmenting the longer-form content, topic identification and/or delineation, named entity recognition for search, and/or the like.

Audio Content Processing

Figure 7:
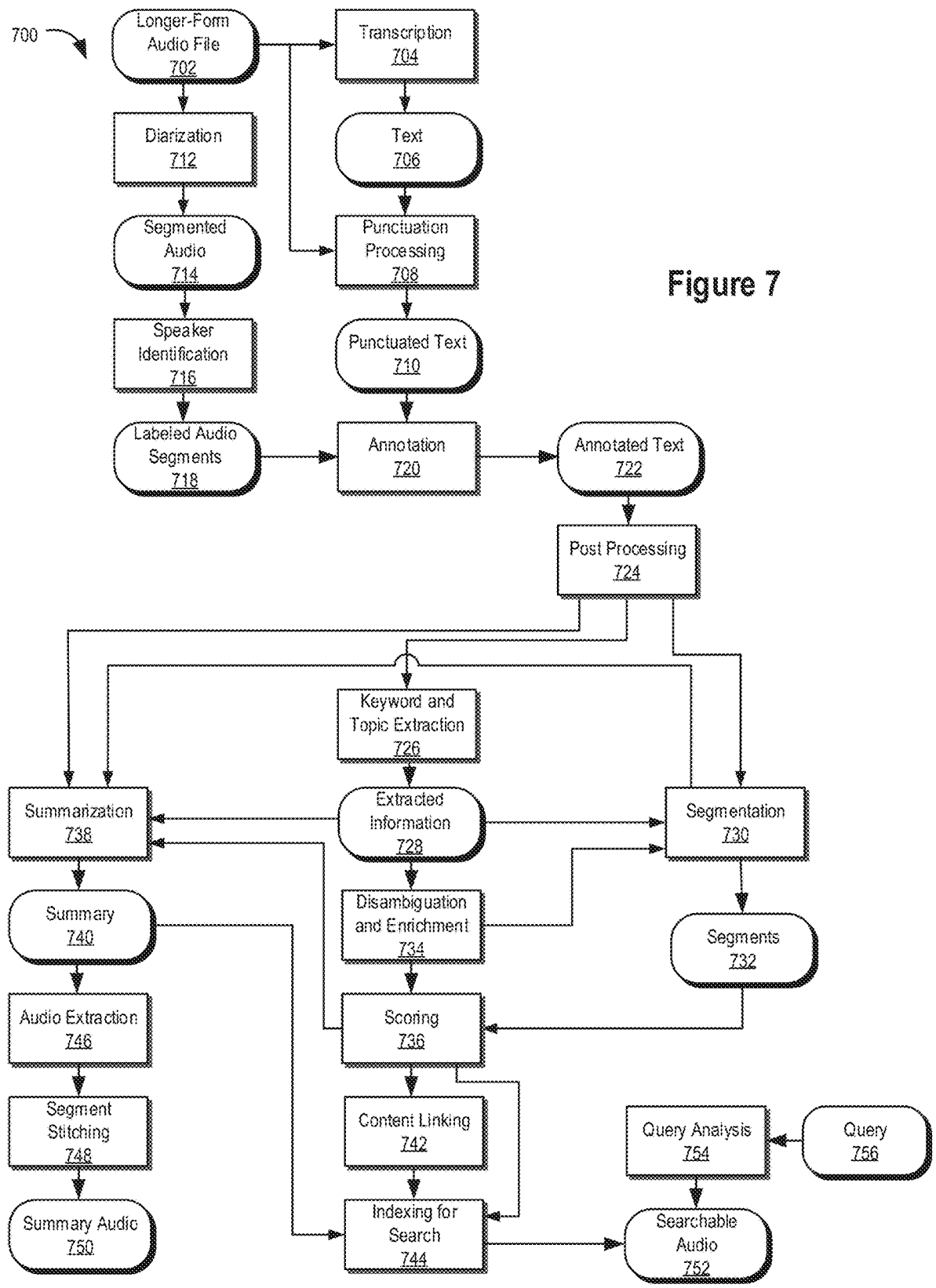
FIG. 7 illustrates a flow chart of an example of a method of processing content consistent with certain embodiments of the present disclosure.

FIG. 7 illustrates a flow chart of an example of a method 700 of processing content consistent with certain embodiments of the present disclosure. The illustrated method 700 may be implemented in a variety of ways, including using software, firmware, hardware, and/or any combination thereof. In certain embodiments, various aspects of the illustrated method 700 and/or its constituent steps may be performed by a content processing service and/or system and/or any suitable combination of one or more services and/or computing systems.

At 702, longer-form audio content may be ingested into the content processing system and/or workflow. The longer-form audio content may be transcribed at 704 into an associated text file 706. In certain embodiments, ASR software and methodologies may be used to transcribe audio content into text (e.g., native and/or third-party ASR software), although other suitable methods and/or combinations of methods may also be used.

In various embodiments, certain post-processing may be performed on the transcribed text files 706 to enhance transcription quality. In some embodiments, better and/or otherwise more accurate transcribed text files may improve subsequent machine learning and/or natural language processing methods consistent with various aspects of the disclosed embodiments. In certain embodiments, post processing may comprise punctuation processing at 708, which may generate punctuated text 710 by applying one or more machine learning algorithms trained on a corpus of text and/or audio data that may analyze the text and/or audio features present in the file 706. Based on the analysis, commas, periods, question marks, exclamation marks, and/or other punctuation may be inserted into the text 706 to generate punctuated text 710.

Machine learning, and/or natural language processing techniques may be used to diarize speakers included in the long form audio content at 712. The audio content may be segmented based on the separate diarized speakers and the separate speakers may be labeled (e.g., numbered and/or the like) in resulting segmented audio content 714. At 716, the identities of individual distinct diarized speakers in the segmented audio content may be identified and/or otherwise recognized using speaker identification and/or recognition techniques. The identified speakers may be used to label associated audio segments of the segmented audio 714 to generate labeled audio segments 718.

The punctuated text 710 and/or labeled audio segments 718 may be processed as part of an annotation process 720 to generate annotated text 722. In some embodiments, the annotation process 720 may comprise, for example, annotation of the text with speakers and/or segments corresponding to diarized speech segments. The annotated text 722 may be post-processed 724 and/or otherwise filtered to remove less informative and/or less relevant content such as, for example and without limitation, advertisements, introductions, pauses, conclusions, and/or the like.

The post-processed text may be analyzed at 726 to extract one or more keywords, key phrases, topics, categories, semantic relations, names, content types, other entities, and/or the like, from the text. This extracted information 728 may be provided to segmentation processes 730 which may analyze the text, taking into account any extracted information, to segment the longer-form audio content into categories (e.g., higher-level categories), topics, subtopics, segments, sentences, and/or phrases and generate associated segments 732. In some embodiments, the extracted information 728 may be mapped to one or more entities to disambiguate their meanings and be enriched at 734 with relationships, properties, and/or other metadata. Additional mappings may also be performed with this information to determine links and relationships between the enriched extracted information and the post-processed text. Enriched extracted information may be further provided to and used in connection with segmentation processes 730 to aid in segmenting the longer-form content 702.

Individual phrases, sentences, and/or segments may be scored 736 (e.g., ranked in order of importance, relevance, and/or interest in the context of the long form audio content 702) and provided to content and/or segment summarization processes 738 to generate one or more cohesive shorter-form summaries 740. Scoring information may be further provided to content search indexing processes 744 as described herein.

In some embodiments, recorded and/or synthesized speech may be inserted in front, in between, and/or at the end of a generated summary 740 to enhance comprehensibility and/or provide additional context as an extension of the summarization 738 process. In certain embodiments, audio may be extracted at 746 from the summaries 740, and associated segments may be stitched together 748 and/or otherwise combined to generate summary audio content 750 for the shorter-form summary and/or highlights to represent to the longer-form audio content. In some embodiments, audio and music elements such as synthesized speech, short audio cues, branded audio, fade ins/outs, music beds, and/or the like may be inserted during segment stitching 748 when generating the summary audio content at 750 to provide additional structure and/or coherence to the summary audio content 750.

In further embodiments, a discourse structure associated with content (e.g., a type of content such as, for example, a podcast, radio show and/or broadcast, interview, phone and/or meeting recording, etc.), may be assigned to content and used to provide additional context in connection with generating segments 732 and/or summaries 740, as well as to drive navigation.

In various embodiments, individual phrases, sentences, and/or segments may be combined into cohesive shorter-form summaries, reels, trailers, highlights, and/or the like representing the longer form content. As noted above, human and/or human or synthesized speech clips, music, sounds, and/or other audition transitions such as fade ins and fade outs may be inserted at the beginning, in between, and/or at the end of segments to provide introductions, context, transitions, and/or otherwise enhance the coherence of the automatically generated summary. In further embodiments, segments may be added to a database and/or a document index so that individual segments, along with associated rankings and/or keywords, phrases, names, and/or other entities may be indexed and/or otherwise be made searchable. Various embodiments of the disclosed systems and methods may generate a unique type of content artifact providing an improved solution for streamlining the curation of and/or interaction with longer-form audio content.

To aid in search indexing, content linking 742 associating keywords and/or key phrases with related key words and/or key phrases to improve audio search and/or recall, among other functionalities, may be performed. Generated summaries 740, scored and/or linked content, and/or segments 732 may be indexed for search at 744, resulting in a searchable content file 752. In some embodiments, query analysis 754 may be performed on received search queries 756 to improve the relevance of search results (e.g., improve determinations regarding which part of content should be considered more relevant to a particular query 756 and/or how individual query search terms are considered).

It will be appreciated that a number of variations can be made to the architecture, relationships, and examples presented in connection with the figures within the scope of the inventive body of work. For example, certain illustrated processing steps may not be included in the data processing workflow and/or additional processing steps may be included. Moreover, embodiments of the disclosed systems and methods may be used to generate shorter-form content (e.g., segments, summaries, highlights, and/or the like) based on the content of a plurality of longer-form audio content files. Thus, it will be appreciated that the architecture, relationships, and examples presented in connection with the figures are provided for purposes of illustration and explanation, and not limitation.

Content Processing Ecosystem

Figure 8:
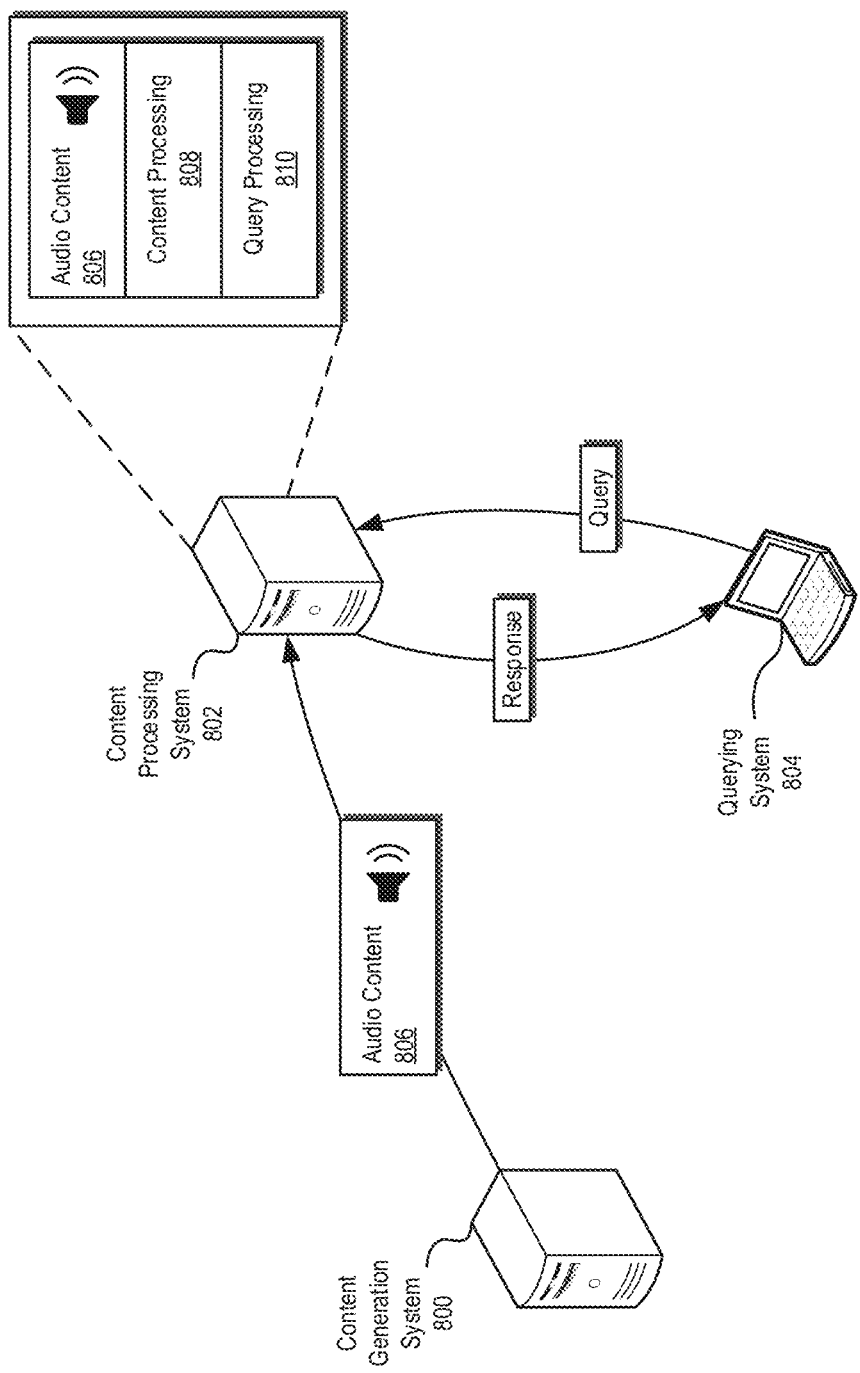
FIG. 8 illustrates an example of an audio content processing ecosystem consistent with certain embodiments of the present disclosure.

FIG. 8 illustrates an example of an audio content processing ecosystem consistent with certain embodiments of the present disclosure. A content processing system 802 may provide a variety of functions that allow for audio content 806 to be processed and/or otherwise analyzed consistent with various aspects of the disclosed embodiments. For example, the content processing system 802 may receive audio content from a content generation system 800 and process the content consistent with embodiments of the disclosed systems and methods (e.g., index the content for search, generate one or more summaries and/or other shorter form content, and/or the like). Although described herein as a content generation system 800, it will be appreciated that the system 800 may not necessarily generate the audio content 806 itself, but instead may function as an intermediate system for communicating the audio content 806 to the content processing system 802 for ingestion and/or processing. The content processing system 802 may further be able to generate one or more suitable responses (e.g., search responses and/or content responses such as content summaries and/or the like) in response to queries received from one or more querying systems 804.

As illustrated, the content processing system 802 may be communicatively coupled with one or more content generation systems 800 and/or querying systems 804 via a network. The network may comprise a variety of network communication devices and/or channels and may utilize any suitable communication protocols and/or standards facilitating communication between the content processing system 802, the content generation system 800, the querying system 804, and/or one or more other systems and/or services. The network may comprise the Internet, a local area network, a virtual private network, and/or any other communication network utilizing one or more electronic communication technologies and/or standards (e.g., Ethernet or the like). In some embodiments, the network may comprise a wireless carrier system, such as a personal communications system ("PCS"), and/or any other suitable communication system incorporating any suitable communication standards and/or protocols. In further embodiments, the network may comprise an analog mobile communications network and/or a digital mobile communications network utilizing, for example, code division multiple access ("CDMA"), Global System for Mobile Communications or Groupe Speciale Mobile ("GSM"), frequency division multiple access ("FDMA"), and/or time divisional multiple access ("TDMA") standards. In certain embodiments, the network may incorporate one or more satellite communication links. In yet further embodiments, the network may utilize IEEE's 802.11 standards, Bluetooth®, ultra-wide band ("UWB"), Zigbee®, and/or any other suitable standard or standards.

The content processing system 802, the content generation system 800, and/or the querying system 804 may comprise a variety of computing devices and/or systems, including any computing system or systems suitable to implement the systems and methods disclosed herein. The systems 800-804 may comprise a variety of computing devices and systems, including laptop computer systems, desktop computer systems, server computer systems, distributed computer systems, smartphones, tablets, and/or the like. It will be appreciated that any suitable configuration of computing systems and storage media could be used in connection with the connected systems 800-804, including without limitation, a single server or cluster of servers, or a distributed collection of heterogeneous computer systems connected by a variety of networks (e.g, such as the Internet, public and/or private networks, and/or the like).

In certain embodiments, the content processing system 802, the content generation system 800, and/or the querying system 804 may comprise at least one processor system configured to execute instructions stored on an associated non-transitory computer-readable storage medium. For example, the content processing system 804 may include excitable instructions configured to implement content processing 808 and/or content query processing 810 methods consistent with the disclosed embodiments. The content processing system 802, the content generation system 800, and/or the querying system 804 may further comprise software and/or hardware configured to enable electronic communication of information between the devices and/or systems 800-804 via the network using any suitable communication technology and/or standard.

As discussed above, a querying system 804 may enable a user of the system to interact with the content processing system 802 in connection with a variety of activities. For example, in certain embodiments, the querying system 804 may be configured to issue requests/queries to the content process system 802. For example, the querying system 804 may issue a search request for relevant audio content from audio content indexed by the content processing system 802 consistent with various disclosed embodiments. In further embodiments, the querying system 804 may issue requests for generated summary and/or other shorter-form content associated with longer form audio content. Associated results and/or responses to issued queries may be returned to the querying system 804 from the content processing system 802.

Figure 9:
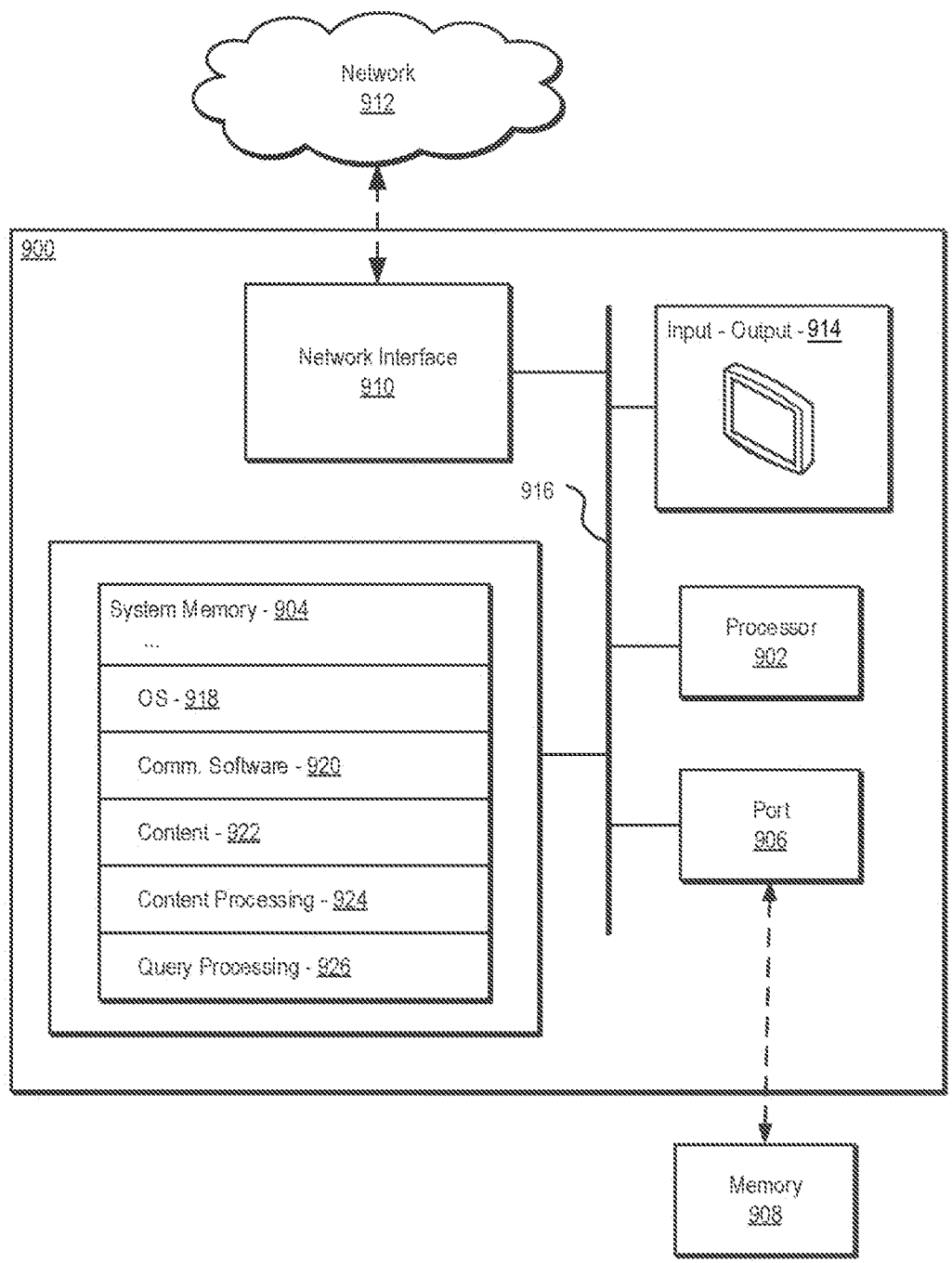
FIG. 9 illustrates an example of a system that may be used to implement certain embodiments of the systems and methods of the present disclosure.

FIG. 9 illustrates an example of a system 900 that may be used to implement certain embodiments of the systems and methods of the present disclosure. Certain elements associated with the illustrated system 900 may be included in a system associated with a content processing system, a querying system, a content generation system, and/or any other system or service configured to implement aspects of the embodiments of the systems and methods disclosed herein.

As illustrated in FIG. 9, the system 900 may include: a processing unit 902; system memory 904, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit 902; a port 906 for interfacing with removable memory 908 that may include one or more diskettes, optical storage mediums, and/or other non-transitory computer-readable storage mediums (e.g., flash memory, thumb drives, USB dongles, compact discs, DVDs, etc.); a network interface 910 for communicating with other systems via one or more network connections 912 using one or more communication technologies; a user interface 914 that may include a display and/or one or more input/output devices such as, for example, a touchscreen, a keyboard, a mouse, a track pad, and the like; and one or more busses 916 for communicatively coupling the elements of the system 900.

The operation of the system 900 may be generally controlled by the processing unit 902 by executing software instructions and programs stored in the system memory 904 and/or internal memory of the processing unit 902. The system memory 904 may store a variety of executable programs or modules for controlling the operation of the system 200. For example, the system memory 204 may include an operating system ("OS") 918 that may manage and coordinate, at least in part, system hardware resources and provide for common services for execution of various applications, modules, and/or services.

The system memory 904 may further include, without limitation, communication software 920 configured to enable in part communication with and by the system 900; one or more applications; content 922 that may include audio content; information and/or executable modules associated content processing 924 and/or query processing 926 consistent with various aspects of the disclosed embodiments; and/or any other information and/or applications configured to implement embodiments of the systems and methods disclosed herein.

The systems and methods disclosed herein are not limited to any specific computer, device, service, or other apparatus architecture and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, an optical storage medium, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein, but may be modified within the scope and equivalents of the appended claims.

What is claimed is:

1. A method of processing content performed by a content processing system comprising a processor and a non-transitory computer-readable storage medium storing instructions that, when executed, cause the content processing system to perform the method, the method comprising:

receiving a first content file;

generating, based on the first content file, a first text file comprising transcribed text corresponding to the first content file;
extracting one or more words from the first text file;
identifying a plurality of segments in the first text file based on the extracted one or more words, wherein identifying the plurality of segments includes iteratively splitting relatively larger segments into smaller segments at split points, and wherein determining a first split point of the split points in a first segment is based on an assessment of a first cohesion of the first segment, a second cohesion of a second segment resulting from the split of the first segment, and a third cohesion of a third segment resulting from the split of the first segment;
identifying based on the extracted one or more words, one or more topics, wherein segments of the plurality of segments are associated with at least one topic of the identified one or more topics, wherein the one or more topics includes a first topic;
identifying, in accordance with one or more parameters, one or more highlight segments from the plurality of segments based on a determined relevance of the one or more highlight segments relative to the first topic; and
generating a second content file, the second content file comprising at least an indication of one more content highlight segments of the content file, wherein a first content highlight segment of the one or more content highlight segments corresponds to a first highlight segment of the one or more highlight segments.

2. The method of claim 1, wherein the one or more parameters comprise one or more user specified parameters comprise at least one of a target size of the one or more content highlight segments, a specified number of content highlight segments, and relative scoring threshold information associated with the one or more highlight segments.

3. The method of claim 1, wherein the method further comprises: scoring one or more segments of the plurality of segments based on the determined relevance of the one or more segments relative to at least the first topic,
wherein identifying the one or more highlight segments is based on a comparison between one or more scores associated with the one or more highlight segments and at least one threshold.

4. The method of claim 1, wherein the method further comprises:
analyzing the first content file to identify one or more speakers; and
labeling portions of the first text file based on the identified one or more speakers,
wherein identifying the plurality of the segments in the first text file is further based on the labeled portions of the first text file.

5. The method of claim 1, wherein identifying the plurality of segments in the first text file is further based on one or more of a lexical feature, and a grammatical feature of the first text file.

6. The method of claim 1, wherein the method further comprises adding punctuation to the first text file prior to identifying the plurality of segments in the first text file.

7. The method of claim 1, wherein identifying the plurality of segments in the first text file comprises,
identifying at least one filtered segment; and
excluding the at least one filtered segment from the plurality of segments.

8. The method of claim 7, wherein the at least one filtered segment comprises at least one of an introduction segment, an advertisement segment, a conclusion segment, and a music segment.

9. The method of claim 1, wherein the one or more topics includes a second topic, and wherein identifying one or more highlight segments from the plurality of segments is further based on a determined relevance of the one or more highlight segments relative to the second topic.

10. The method of claim 1, wherein identifying, based on the extracted one or more words, one or more topics comprises generating a content graph linking at least a portion of the extracted one or more words associated with a first segment to the first topic, and at least a portion of the extracted one or more word associated with a second segment to a second topic.

11. A system comprising:
one or more processors; and
memory storing executable instructions that, when executed by the one or more processors,
cause the system to:
receive a first content file;
generate, based on the first content file, a first text file comprising transcribed text corresponding to the first content file;
extract one or more words from the first text file;
identify a plurality of segments in the first text file based on the extracted one or more words, wherein identifying the plurality of segments includes splitting a first segment into a second segment and a third segment, and assessing a first cohesion of the first segment, a second cohesion of a second segment, and a third cohesion of a third segment resulting;
identify, based on the extracted one or more words, one or more topics, wherein segments of the plurality of segments are associated with at least one topic of the identified one or more topics, wherein the one or more topics includes a first topic,
identify, in accordance with one or more parameters, one or more highlight segments from the plurality of segments based on a determined relevance of the one or more highlight segments relative to the first topic; and
generate a second content file, the second content file comprising at least an indication of one more content highlight segments of the content file, wherein a first content highlight segment of the one or more content highlight segments corresponds to a first highlight segment of the one or more highlight segments.

12. The system of claim 11, wherein the one or more parameters comprise one or more user specified parameters comprise at least one of a target size of the one or more content highlight segments, a specified number of content highlight segments, and relative scoring threshold information associated with the one or more highlight segments.

13. The system of claim 11, wherein the executable instructions include further instructions that, when executed by the one or more processors, further cause the system to:
score one or more segments of the plurality of segments based on the determined relevance of the one or more segments relative to at least the first topic,
wherein identifying the one or more highlight segments is based on a comparison between one or more scores associated with the one or more highlight segments and at least one threshold.

14. The system of claim 11, wherein the executable instructions include further instructions that, when executed by the one or more processors, further cause the system to:
analyze the first content file to identify one or more speakers; and
label portions of the first text file based on the identified one or more speakers, wherein identifying the plurality of the segments in the first text file is further based on the labeled portions of the first text file.

15. The system of claim 11, wherein identifying the plurality of segments in the first text file is further based on one or more of a lexical feature, and a grammatical feature of the first text file.

16. The system of claim 11, wherein the executable instructions include further instructions that, when executed by the one or more processors, further cause the system to:
add punctuation to the first text file prior to identifying the plurality of segments in the first text file.

17. The system of claim 11, wherein the executable instructions include further instructions that, when executed by the one or more processors to identify the plurality of segments in the text file, further cause the system to,
identify at least one filtered segment; and
exclude the at least one filtered segment from the plurality of segments, wherein the at least one filtered segment comprises at least one of an introduction segment, an advertisement segment, a conclusion segment, and a music segment.

18. The system of claim 11, wherein the one or more topics includes a second topic, and wherein identifying one or more highlight segments from the plurality of segments is further based on a determined relevance of the one or more highlight segments relative to the second topic.

19. The system of claim 11, wherein identifying, based on the extracted one or more words, one or more topics comprises generating a content graph linking at least a portion of the extracted one or more words associated with a first segment to the first topic, and at least a portion of the extracted one or more word associated with a second segment to a second topic.

* * * * *